United States Patent
Hettich et al.

[11] Patent Number: 5,583,479
[45] Date of Patent: Dec. 10, 1996

[54] METHOD OF OPERATING A MOTOR VEHICLE ALARM SYSTEM HAVING A CENTRAL CONTROL UNIT

[75] Inventors: Gerhard Hettich, Dietenhofen; Peter Robitschko, Sindelfingen, both of Germany

[73] Assignee: Temic Telefunken Microelectronic GmbH, Heilbronn, Germany

[21] Appl. No.: 126,230

[22] Filed: Sep. 24, 1993

[30] Foreign Application Priority Data

Sep. 28, 1992 [DE] Germany ............... 42 32 435.1

[51] Int. Cl.⁶ ............................... B60R 25/00
[52] U.S. Cl. ............... 340/426; 340/825.32; 307/10.2
[58] Field of Search ............... 340/425.5, 426, 340/825.3, 825.32, 825.31; 307/9.1, 10.1, 10.2, 10.4, 10.5

[56] References Cited

U.S. PATENT DOCUMENTS

| | | | |
|---|---|---|---|
| 4,642,631 | 2/1987 | Rak | 340/825.31 |
| 4,688,036 | 8/1987 | Hirano | 340/825.69 |
| 4,754,255 | 6/1988 | Sanders et al. | 340/64 |
| 4,888,575 | 12/1989 | De Vaulx | 340/426 |
| 5,006,843 | 4/1991 | Hauer | 340/825.31 |
| 5,229,648 | 7/1993 | Sues et al. | 307/10.2 |
| 5,245,330 | 9/1993 | Wassink | 340/825.34 |

FOREIGN PATENT DOCUMENTS

| | | | |
|---|---|---|---|
| 0105774A1 | 4/1984 | European Pat. Off. | |
| 0442627 | 8/1991 | European Pat. Off. | B06N 2/02 |
| 4141504 | 8/1992 | Germany | B06R 16/02 |
| 2251503 | 7/1992 | United Kingdom | B60R 25/00 |
| 93/05987 | 4/1993 | WIPO | B60R 25/00 |

*Primary Examiner*—Wendy R. Greening
*Assistant Examiner*—Ngoc-Yen Vu
*Attorney, Agent, or Firm*—Spencer & Frank

[57] ABSTRACT

A method is described for operation of a motor vehicle alarm system having a central control unit connected to several control units of the motor vehicle. All non-safety-relevant control units of the vehicle are bidirectionally connected to the central control unit of the alarm system, where a certain code for the respective activation state of the alarm system is stored in the non-safety-relevant control units and can be read out there. In the case of a replacement of control units the replaced control units are activated by the non-replaced control units in the original form when the vehicle is started. At least a part of the non-safety-relevant control units is deactivated or negatively affected in operation when the alarm system is not deactivated correctly.

5 Claims, 2 Drawing Sheets

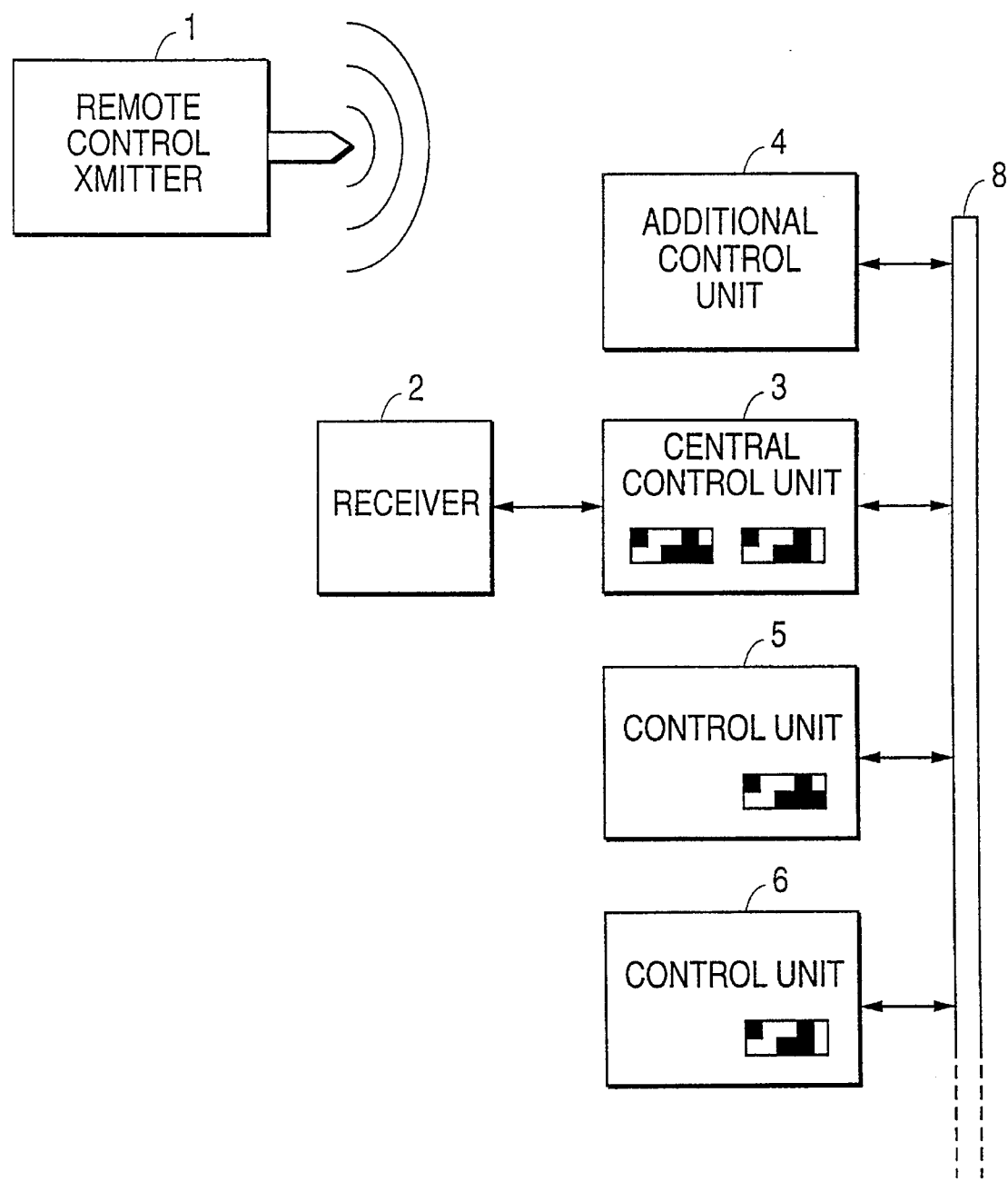

METHOD OF OPERATING A MOTOR VEHICLE ALARM SYSTEM HAVING A CENTRAL CONTROL UNIT

BACKGROUND OF THE INVENTION

The invention relates to a method for operation of a motor vehicle alarm system in accordance with the preamble of claim 1.

A method of this type is known from EP 0 105 774.

Motor vehicles are generally secured against theft by alarm systems that watch over door contacts, current loops and the vehicle interior. If an alarm is triggered, a central control unit—the "alarm center"—either actuates signal devices such as horn, hazard warning light or headlamp flasher (passive methods), or prevents starting of the vehicle or engine control system (active methods). However, these passive and active methods cannot provide effective protection of the vehicles, since all the effects of the alarm can easily be neutralized—particularly by professional car thieves—by deactivating or disabling the alarm system.

In the generic publication EP 0 105 774 mentioned at the outset, the alarm system's central control unit, connected unidirectionally to various control units of the motor vehicle, is accommodated inaccessibly inside the vehicle (for example inside the engine-transmission assembly, the transmission or the vehicle chassis); since the central control unit can only be removed and replaced at very great expense, relatively effective albeit expensive theft protection is ensured.

SUMMARY OF THE INVENTION

The object underlying the invention is to provide a method in accordance with the preamble of claim 1 whereby vehicle thefts can be prevented lastingly yet without great expense. This object is attained by the features in the characterizing part of claim 1.

Advantageous embodiments of the method are set forth in the dependent Claims.

All non-safety-relevant control units of the vehicle are either bidirectionally connected individually to the central control unit of the alarm center, or are bidirectionally connected to one another and to the central control unit via a BUS system. The information on the activation state of the alarm system is stored in coded form in the control units and can be read out at any time. Each control unit can pass on this information to other control units, so that all control units are always in the same activation state; in particular, when the central control unit or one or more of the non-safety-relevant control units is replaced, the replaced control unit or units is or are reactivated by the non-replaced units in the original form. The coded information on the activation state stored in the control units can be read off at each control unit and/or at a diagnostic plug; if the alarm system has not been deactivated correctly, the vehicle is immediately identifiable as stolen at checks or when at a garage.

In the event that the alarm system has not been deactivated correctly, use of the vehicle is prevented or rendered more difficult with respect to several, or advantageously all, non-safety-relevant control units when the vehicle is started, such that these units are able to perform their function either not at all, or only incompletely or significantly less well. This is particularly efficient in the case of control units that afford the driver a certain comfort (for example window operators, seat adjusters, air-conditioning system, etc.), that provide information (instrument cluster), or that offer additional safety (ABS, airbag). Safety-relevant interference with the engine, transmission and brakes is not provided for, but the engine control, for example, can be affected such that acceleration and/or fuel consumption are markedly poorer. In particular, any legally permissible possibility for manipulation should be used to maximize the expense of eliminating the faults (only feasible by replacing all control units).

Unlike most conventional alarm systems (acoustic or visual alarm, prevention of vehicle starting), the protective function of the present alarm system is achieved in that the value of using a stolen vehicle is considerably reduced, that unauthorized deactivation of the alarm system is only feasible by the replacement of all control units and of the central control unit (immensely expensive), and that it is clearly verifiable and obvious whether the vehicle has been stolen; this has a deterrent effect on car thieves and can therefore contribute greatly to a reduction in the number of car thefts.

DESCRIPTION OF THE DRAWINGS

The invention is further described in detail on the basis of FIGS. 1 and 2, where FIG. 2 shows an alarm system with several coded control units connected via a BUS system.

DESCRIPTION OF THE PREFERRED EMBODIMENTS

Figure 1:
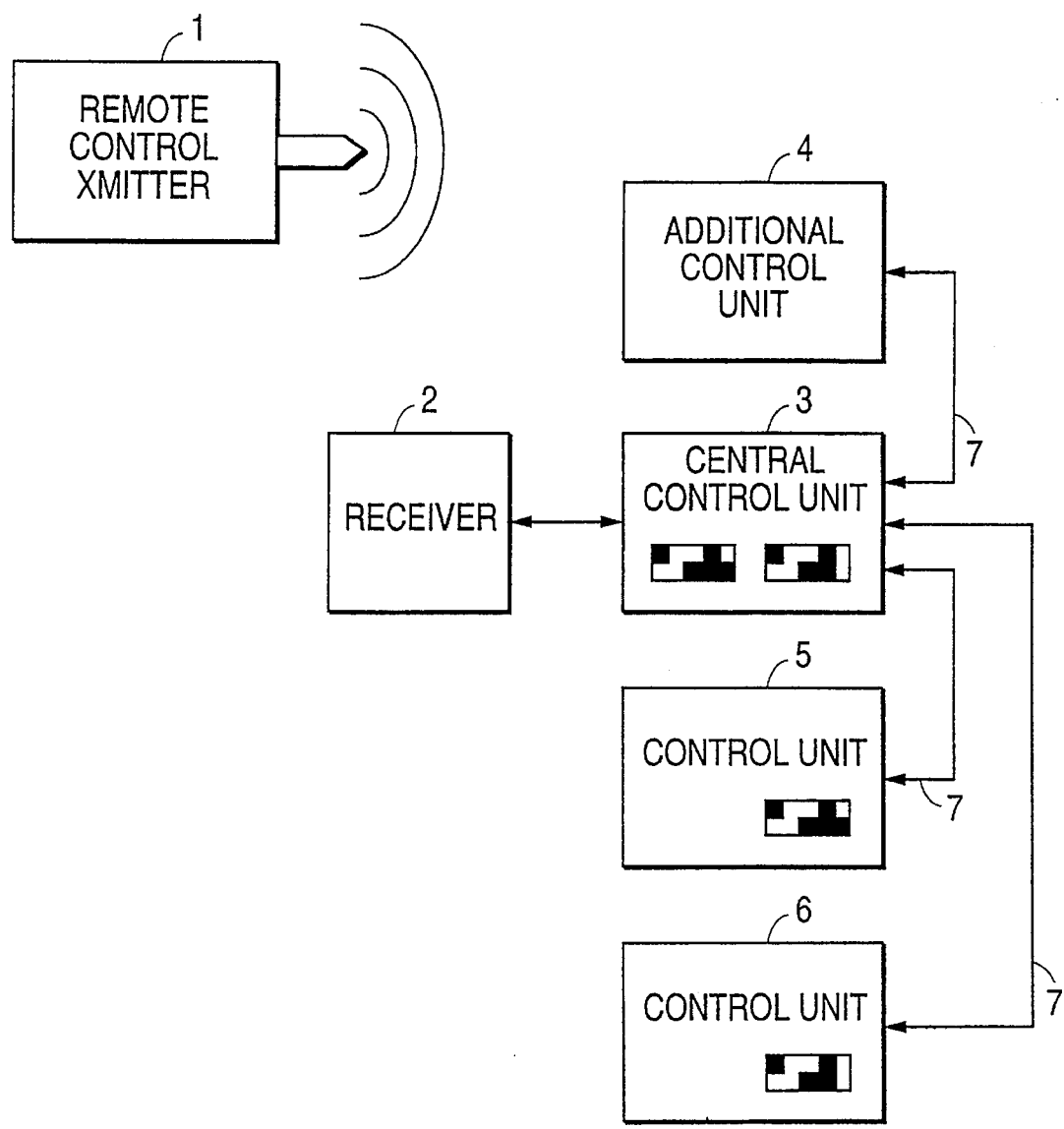
FIG. 1 is a diagram of an alarm system having several coded individual control units.

In accordance with FIG. 1, the alarm center 3 of the alarm system is connected bidirectionally via individual cables 7 to the control units 5, 6 and to an additional control unit 4 for emergency deactivation; in accordance with FIG. 2, a BUS system 8 interlinking the aforementioned control units is provided for bidirectional connection of the individual control units 5, 6, the alarm center 3 and the additional control unit 4. If the vehicle is started and the alarm system has not been deactivated correctly, the control units 5, 6 are considerably impaired in their operation or put completely out of action by the alarm center 3; operation is not resumed until the alarm center 3 has been correctly deactivated or until all the control units 3, 5, 6 have been replaced. The control units 5, 6 have a memory element (for example an EEPROM) in which a certain code is stored for the deactivated or activated state; the respective activation state can be read off at any time at the control units or at a diagnostic unit. Bidirectional interlinking of the control units 5, 6 to the alarm center 3 ensures that all control units 3, 5, 6 exchange information with one another and are simultaneously impaired in their operation or, in the case of replacement of one of the control units, can store the original activation state in the replaced control unit. The alarm system is activated and deactivated by a remote control system with transmitter 1 and receiver 2, and therefore cannot be neutralized by mechanical manipulation of the vehicle. In an emergency, the vehicle is mechanically unlocked and the alarm system or alarm center 3 deactivated using the additional control unit 4 or a control element (for example a keypad with secret number or complicated sequence of switch actuations).

What is claimed is:

1. A method for operation of a motor vehicle alarm system having a central control unit connected to a plurality of vehicle system controllers including non-safety-relevant vehicle system controllers of the motor vehicle, comprising:

bidirectionally connecting the non-safety-relevant vehicle system controllers of said vehicle to said central control unit of said motor vehicle alarm system, storing with said central control unit of said motor vehicle alarm system a code indicative of an activation state of said motor vehicle alarm system in the non-safety-relevant vehicle system controllers the code being capable of being subsequently read out by said central control unit of said motor vehicle alarm system, when said vehicle is started, and using the code stored in one of the non-safety-relevant vehicle system controllers, to initialize at least one of:
  (a) a new central control unit of said motor vehicle alarm system; and
  (b) a new non-safety-relevant vehicle system controller;

provided that at least one of the following conditions exists:
  (1) replacement of the central control unit of said motor vehicle alarm system, and
  (2) replacement of one of the non-safety-relevant vehicle system controllers, wherein at least one of:
  (a) the new central control unit of said motor vehicle alarm system, and
  (b) the new non-safety-relevant vehicle system controller,
is initialized to be in the activation state indicated by the code, and affecting operation of at least one non-safety-relevant vehicle system controller when said motor vehicle alarm system had not been deactivated correctly as indicated by the code, said affecting operation including at least one of:
  (i) deactivating, and
  (ii) negatively affecting operation thereof.

2. A method according to claim 1, wherein said step of bidirectionally connecting the non-safety-relevant vehicle system controllers to said central control unit of said motor vehicle alarm system comprises connecting each non-safety-relevant controller with said central control unit of said motor vehicle alarm system using respective separate cables.

3. A method according to claim 1, wherein said step of bidirectionally connecting the non-safety-relevant vehicle system controllers to said central control unit of said motor vehicle alarm system comprises inter-connecting the non-safety-relevant vehicle system controllers with said central control unit of said motor vehicle alarm system using a BUS system.

4. A method according to claim 1, wherein said motor vehicle alarm system is activated and deactivated by a remote control system including a transmitter and a receiver connected to said central control unit of said motor vehicle alarm system.

5. A method according to claim 1, wherein said motor vehicle alarm system further comprises an additional central control unit for use in deactivating the motor vehicle alarm system in an emergency.

* * * * *